(12) United States Patent
Del Zoppo

(10) Patent No.: US 12,416,436 B2
(45) Date of Patent: Sep. 16, 2025

(54) ELECTRONIC CONTROLLER CONNECTABLE TO ONE OR MORE LOADS FOR MONITORING THE LOADS

(71) Applicant: CAREL INDUSTRIES S.p.A., Brugine (IT)

(72) Inventor: Francesco Del Zoppo, Brugine (IT)

(73) Assignee: CAREL INDUSTRIES S.P.A., Brugine (IT)

(*) Notice: Subject to any disclaimer, the term of this patent is extended or adjusted under 35 U.S.C. 154(b) by 600 days.

(21) Appl. No.: 17/759,470

(22) PCT Filed: Jan. 29, 2021

(86) PCT No.: PCT/IB2021/050707
§ 371 (c)(1),
(2) Date: Jul. 26, 2022

(87) PCT Pub. No.: WO2021/152524
PCT Pub. Date: Aug. 5, 2021

(65) Prior Publication Data
US 2023/0059654 A1   Feb. 23, 2023

(30) Foreign Application Priority Data
Jan. 30, 2020   (IT) .................. 102020000001795

(51) Int. Cl.
*F25B 49/00* (2006.01)
(52) U.S. Cl.
CPC ........ *F25B 49/005* (2013.01); *F25B 2700/15* (2013.01)
(58) Field of Classification Search
CPC .... F25B 49/00; F25B 49/005; F25B 2700/15; F25B 2700/00; G05F 1/00; G05F 1/10;
(Continued)

(56) References Cited

U.S. PATENT DOCUMENTS 7,010,363 B2 * 3/2006 Donnelly ............... H02J 3/14
  700/286
8,604,630 B2 * 12/2013 Folken ................. H02P 9/006
  361/72

(Continued)

FOREIGN PATENT DOCUMENTS

JP   2003169419 A   6/2003
KR   101206081 B1   12/2012

OTHER PUBLICATIONS

International Search Report & Written Opinion dated May 20, 2021 from PCT Application No. PCT/IB2021/050707, 10 pages.

*Primary Examiner* — Jeffrey A Gblende
(74) *Attorney, Agent, or Firm* — INNOVATION CAPITAL LAW GROUP, LLP; Vic Lin

(57) ABSTRACT

Electronic controller comprising: —a power supply (11) connectable to a power supply network (12); —at least one connector (13a, 13b, 13c) adapted to be connected to a load (14a, 14b, 14c) in order to supply it; —a microcontroller (15) connected to the power supply (11) and to the at least one connector (13a, 13b, 13c) in order to apply to the latter a supply voltage in a controlled manner; —at least one detection device (16a, 16b, 16c, 16d) configured to detect a current flow through the connector (13a, 13b, 13c). The microcontroller (15) is connected to the detection device (16a, 16b, 16c, 16d) and is configured to zero the supply voltage if, following application of the supply voltage, the detection device (16a, 16b, 16c, 16d) does not detect a current flow through the connector (13a, 13b, 13c).

18 Claims, 2 Drawing Sheets

(58) Field of Classification Search
CPC ... G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | | | |
|---|---|---|---|---|
| 10,215,426 | B2* | 2/2019 | Kim | F24F 11/52 |
| 10,826,394 | B2* | 11/2020 | Nagashima | H02M 1/088 |
| 11,155,037 | B2* | 10/2021 | Garcia | B41J 29/38 |
| 2009/0102294 | A1 | 4/2009 | Hodges et al. | |
| 2015/0357957 | A1 | 12/2015 | Ooneda | |
| 2018/0301293 | A1* | 10/2018 | Uchino | B60R 16/03 |

* cited by examiner

ELECTRONIC CONTROLLER CONNECTABLE TO ONE OR MORE LOADS FOR MONITORING THE LOADS

The present invention relates to an electronic controller, in particular for refrigeration machines.

In particular, the present controller can be connected to a plurality of loads in order to supply them and is able to detect more efficiently than the prior art the presence or absence of a load and, if necessary, estimate the consumption thereof in terms of power absorbed and energy used during operation of the said load.

In particular, the present invention is applicable to structurally very simple controllers for low-cost applications where the provision of devices for monitoring the functionality of the said controller is not justifiable from a cost point of view.

More specifically, these controllers are of the type used to manage the operation of fan coils or peripheral heat exchange units of a domestic or industrial air-conditioning plant.

More specifically, these controllers are typically used in devices which are commonly known as chest freezers, storage cabinets, bottle coolers, supermarket cabinets and fan coils.

Nowadays it is known to detect the voltage of the power supply network connected to an electronic controller, in order to detect any positive or negative voltage peaks which may interfere with correct operation of the controller itself or of the loads connected to it or adversely affect the functioning thereof.

However, the controllers known nowadays, in particular for the aforementioned applications, do not have a function for detecting the presence of a load or operation thereof, such that, when, during use, activation of a particular load is required, the controller switches the associated power supply relay irrespective as to whether this load is actually connected to the controller or is functional.

Although nowadays devices for detecting and monitoring the presence of loads are known, the use of such devices is not economically justifiable for particularly low-cost applications such as those mentioned above.

In this context, the problem underlying the present invention is that of increasing the efficiency and the safety by making it possible to detect the presence and/or the functioning of a load when activation thereof is required.

The main task of the present invention consists in providing an electronic controller which is able to solve said problem, while overcoming the drawbacks associated with the conventional controllers described above.

In connection with this task it is an object of the present invention to propose an electronic controller which is able to detect promptly, upon operation of the activation relay of a load, whether this load is actually connected to the relay and/or whether it is actually functioning, while being structurally simple and low-cost.

Another object of the present invention is to provide an electronic controller which is able at the same time to detect the energy absorbed by the loads connected to it, during their operation and/or the power absorbed by them, over time, so as to allow the application of energy saving and optimization algorithms.

Another object of the invention is to propose an electronic controller which is structurally simple and easy to use and install.

This task, as well as these and other objects which will become clearer below are achieved by an electronic controller according to the attached claim 1.

Detailed characteristics of an electronic controller according to the invention are described in the corresponding dependent claims.

Further characteristic features and advantages will emerge more clearly from the description of a preferred, but non-exclusive embodiment of an electronic controller according to the invention, shown by way of a non-limiting example in the attached sets of drawings in which.

Figure 1:
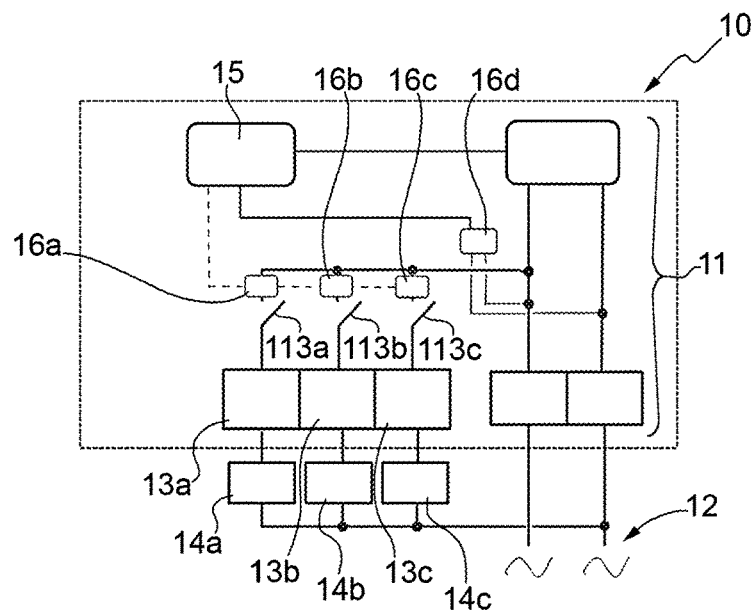
FIG. 1 shows a simplified diagram of an electronic controller according to the present invention.

With particular reference to the said figures, 10 denotes overall an electronic controller which, according to the present invention, generally comprises:

- a power supply 11, connectable to an electric power supply network 12;
- at least one connector 13a, 13b, 13c adapted to be connected to a load 14a, 14b, 14c in order to supply it;
- a microcontroller 15, connected to the power supply 11 and to at least one connector 13a, 13b, 13c in order to apply to the latter a supply voltage in a controlled manner;
- at least one detection device 16a, 16b, 16c, configured to detect a current flow through the connector 13a, 13b, 13c.

The microcontroller 15 is connected to the detection device 16a, 16b, 16c, 16d and is configured to zero said supply voltage if, following application of said supply voltage, the detection device 16a, 16b, 16d does not detect current flow through the connector 13a, 13b, 13c.

In this way, the controller 10 is able to detect whether a load 14a, 14b, 14c absorbs current from the corresponding connector 13a, 13b, 13c, namely whether a load 14a, 14b, 14c is connected or not to the connector 13a, 13b, 13c.

The connector may comprise or consist of a relay 113a, 113b, 113c connected to the microcontroller 15 so as to be operated, upon command, to supply the respective load 14a, 14b, 14c.

By means of a quantitative detection of the current absorbed it is also possible to detect whether the load functions in the expected conditions.

For this purpose, preferably, the microcontroller 15 will be configured or programmed to compare with predetermined control values, preferably set depending on the load to be monitored, the current intensity absorbed by said load 14a, 14b, 14c across the corresponding connector 13a, 13b, 13c.

The attached figures show by way of a non-limiting example diagrams of controllers 10 which have three loads 14a, 14b, 14c connected to three corresponding connectors 13a, 13b, 13c and one or four detection devices 16a, 16b, 16c, 16d.

As will become clear from the present disclosure the description provided here will be, mutatis mutandis, applicable to controllers having also only one connector which can be connected to a single load or having a plurality of, numerically also more than three, connectors which can be connected to corresponding loads.

Where not specifically indicated, the present description will have a broad scope and will refer, where compatible, both to the diagrams shown in the attached figures and to any alternative diagrams not shown.

Each detection device 16a, 16b, 16c may also be configured to detect also an electric voltage at the connector(s) 13a, 13b, 13c.

The microcontroller 15 may be configured to process a current signal and a voltage signal which, during use, it receives from the detection device 16a, 16b, 16c, in order to estimate power and/or energy absorbed by a load 14a, 14b, 14c connected to the connector(s) 13a, 13b, 13c.

Clearly, in the case where the controller comprises a plurality of detection devices 16a, 16b, 16c, 16d, of these all or only some of them may be configured to detect also an electric voltage at the connector(s) 13a, 13b, 13c to which they are connected.

In this way, the controller 10 is able to estimate the energy and/or the power absorbed by the respective load 14a, 14b, 14c during operation of the latter. This allows the application of energy consumption optimization algorithms.

At least one detection device 16a, 16b, 16c and 16d may be connected to the power supply 11 in order to detect a voltage of the power supply network 12.

Where, according to the particular implementation requirements of the present invention, the controller 10 comprises exclusively a detection device 16d, this may be connected to the power supply 11 in order to detect a voltage of the power supply network 12, and configured for this purpose.

Figure 2:
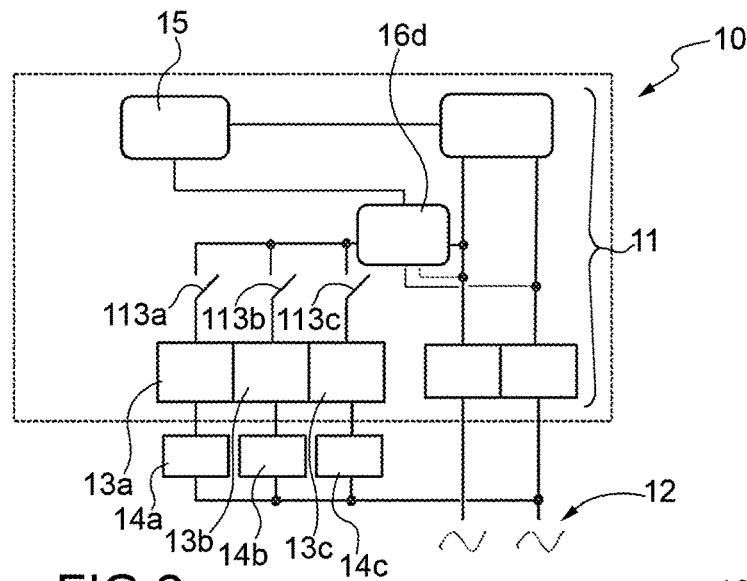
FIGS. 2 and 3 show simplified diagrams of variants of the controller shown in FIG. 1.
Figure 3:
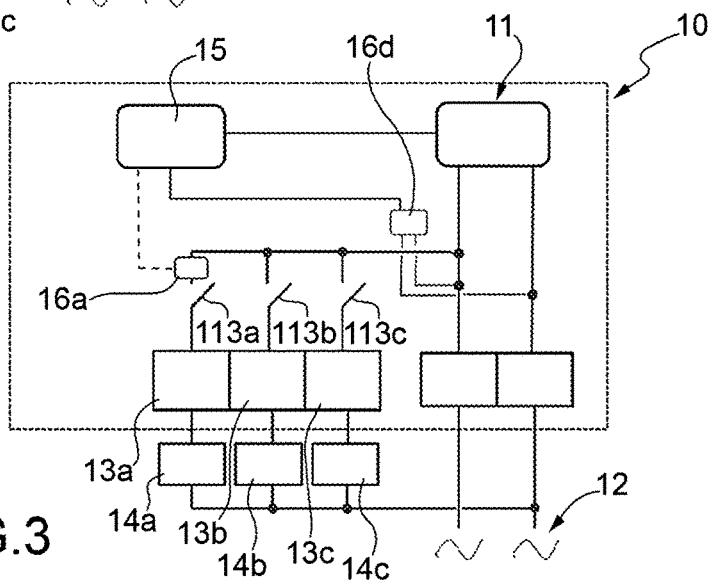
Figure 4:
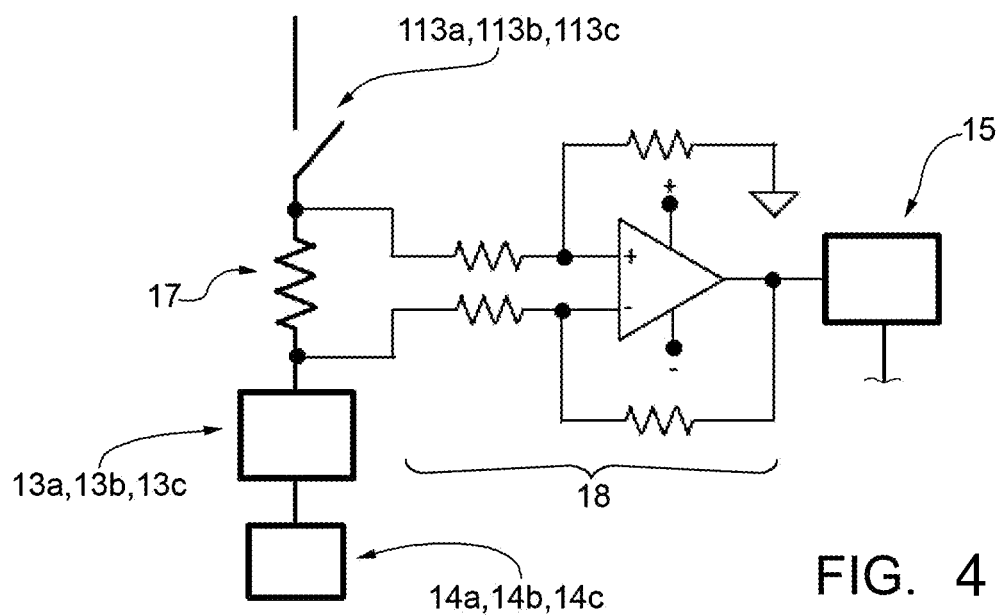
FIGS. 4 and 5 show simplified diagrams of a detail of the controller according to the present invention, relating to a current detection device.
Figure 5:
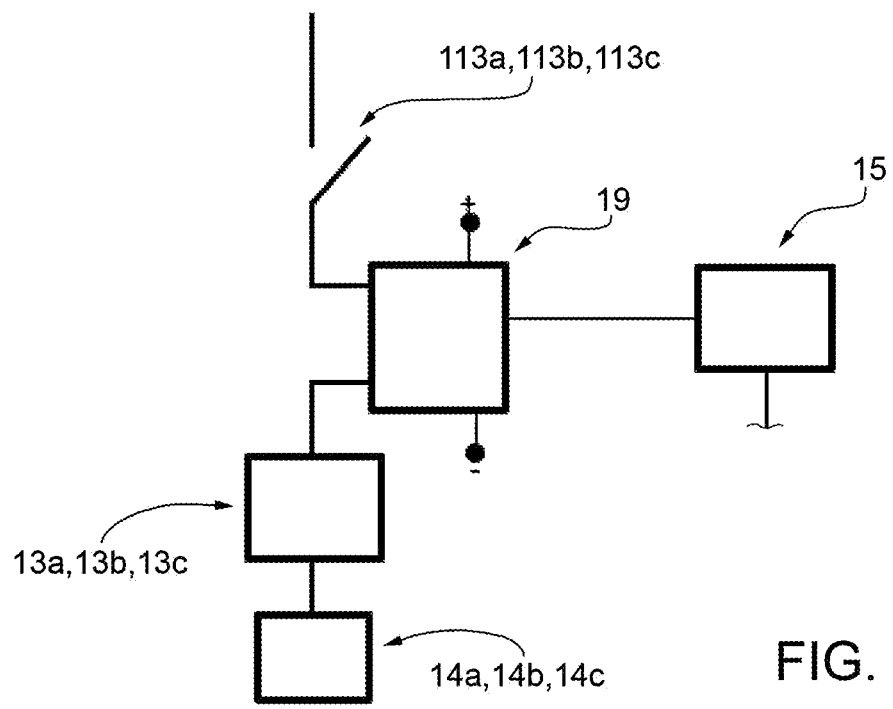

If, however, the controller 10 comprises a plurality of detection devices 16a, 16b, 16c and 16d, preferably only one detection device 16d selected from them will be connected to the power supply 11 in order to detect a voltage of the power supply network 12, and configured for this purpose, as shown in FIG. 2 by way of a non-limiting example, or an auxiliary detection device 16d may be provided and configured to detect exclusively a voltage of the power supply network 12 and for this purpose is connected to the power supply unit 11 and to the microcontroller, in order to send it a signal for detection of said voltage, as shown by way of example in FIGS. 1 and 3.

In general, as already mentioned, the controller 10 may comprise a plurality of connectors 13a, 13b, 13c, each adapted to be connected to a different load 14a, 14b, 14c of a plurality of loads.

As shown by way of example in FIG. 3, the detection device 16a may be only one and connected only to one connector 13a of said plurality, preferably to a power supply connector 13a of a refrigeration machine compressor.

In this way it is possible to provide detection devices 16a, 16b or 16c which are connected only to connectors 13a, 13b, 13c intended for large loads, as in the case of a refrigeration machine compressor or as could be the fan for forced-convection heat exchange of evaporators and/or condensers of refrigeration machines.

Alternatively, as shown for example in FIG. 1, the controller 10 may comprise a plurality of detection devices 16a, 16b, 16c, each connected to a single connector 13a, 13b, 13c of said plurality of connectors, so as to be able to monitor each of them.

In a further variant of the controller 10, still falling within the scope of protection of the attached claims, the controller may comprise only one detection device 16d which will be at the same time connected to each connector 13a, 13b, 13c of said plurality of connectors, for detecting the current flow in at least one of them, as shown for example in FIG. 3.

In general, a detection device 16a, 16b, 16c may for example be configured to measure current by means of a shunt resistance 17 connected to the microcontroller 15.

In this case, the current may be measured by detecting and suitably conditioning, for example by means of amplifier 18, a voltage drop at the terminals of the shunt resistance 17.

This solution is simple and low-cost, immune to external electromagnetic fields, but does not provide galvanic isolation of the line and signal and causes power dissipation on the shunt resistance 17; therefore it is preferable when the currents to be measured are low, namely with values of between approximately 5 A and 10 A, the cost of product is critical and the isolation is not mandatory.

As an alternative, a detection device 16a, 16b, 16c may for example be configured to measure current by means of a Hall effect integrated circuit 19 connected to the microcontroller 15.

In this case, the current may be measured by means of the Hall effect, and therefore electromagnetically, within the Hall effect integrated circuit 19.

This solution is more costly, complex and less immune to external electromagnetic fields compared to the preceding solution, but provides galvanic isolation of the line and signal, is more precise and allows the measurement of high currents with very low power dissipation; therefore it is preferable when a high degree of reading accuracy is required, isolation of power and logic is obligatory and the currents involved are high, i.e. greater than about 10 A. The invention thus devised may be subject to numerous modifications and variations, all of which fall within the scope of protection of the attached claims.

Moreover, all the details may be replaced by other technically equivalent elements.

In practice the materials used as well as the associated forms and dimensions may be varied depending on the particular requirements and the state of the art.

Where the constructional characteristics and the techniques mentioned in the following claims are followed by reference numbers or symbols, these reference numbers or symbols have been assigned with the sole purpose of facilitating understanding of the said claims and consequently they do not limit in any way the interpretation of each element which is identified, purely by way of example, by said reference numbers or symbols.

The invention claimed is:

1. An electronic controller comprising:
    a power supply (11), connectable to a power supply network (12);
    at least one connector (13 a, 13 b, 13 c) adapted to be connected to a load (14 a, 14 b, 14 c);
    a microcontroller (15), connected to said power supply (11) and to said at least one connector (13 a, 13 b, 13 c) in order to apply to the at least one connector a supply voltage in a controlled manner;
    at least one detection device (16 a, 16 b, 16 c, 16 d), configured to detect a current flow through said connector (13 a, 13 b, 13 c);
    said microcontroller (15) being connected to said detection device (16 a, 16 b, 16 c, 16 d) and configured to interrupt or zero said supply voltage if, following application of said supply voltage, said detection device (16 a, 16 b, 16 c, 16 d) does not detect a current flow through said connector (13 a, 13 b, 13 c), wherein said detection device (16 a, 16 b, 16 c, 16 d) is configured to detect also an electrical voltage at said at least one connector (13 a, 13 b, 13 c) and said microcontroller (15) is configured to process a current signal and a voltage signal which, during use, the microcontroller receives from said detection device (16 a, 16 b, 16 c, 16 d), in order to estimate power and/or energy absorbed by the load (14 a, 14 b, 14 c) connected to said at least one connector (13 a, 13 b, 13 c).

2. The controller according to claim 1, wherein said detection device (16 a, 16 b, 16 c, 16 d) is connected to said power supply (11) in order to detect a voltage of said power supply network (12).

3. The controller according to claim 1, comprising a plurality of said at least one connector (13 a, 13 b, 13 c), each adapted to be connected to a different load (14 a, 14 b, 14 c) of a plurality of loads.

4. The controller according to claim 3, wherein said detection device (16 a, 16 b, 16 c, 16 d) is connected to only one connector (13 a, 13 b, 13 c) of said plurality, preferably to a power supply connector (13 a, 13 b, 13 c) of a refrigeration machine compressor.

5. The controller according to claim 3, comprising a plurality of said at least one detection device (16 a, 16 b, 16 c, 16 d), each connected to a single connector (13 a, 13 b, 13 c) of said plurality of connectors or
comprising only one of said detection devices (16 a, 16 b, 16 c, 16 d) connected to each connector (13 a, 13 b, 13 c) of said plurality of connectors in order to detect the current flow in at least one of said connectors.

6. The controller according to claim 1, wherein at least one of said detection devices (16 a, 16 b, 16 c, 16 d) comprises a shunt resistance (17) and is configured to measure current by means of said shunt resistance (17).

7. The controller according to claim 6, wherein said detection device (16 a, 16 b, 16 c, 16 d) comprises an amplifier (18) connected to said shunt resistance (17) and configured to amplify a voltage signal detected at the terminals of said shunt resistance (17).

8. The controller according to claim 1, wherein at least one of said detection devices (16 a, 16 b, 16 c, 16 d) comprises a Hall effect integrated circuit (19).

9. The controller according to claim 1, wherein said detection device (16 a, 16 b, 16 c, 16 d) is connected to said power supply (11) in order to detect a voltage of said power supply network (12).

10. The controller according to claim 1, comprising a plurality of said at least one connector (13 a, 13 b, 13 c), each adapted to be connected to a different load (14 a, 14 b, 14 c) of a plurality of loads.

11. The controller according to claim 2, comprising a plurality of said at least one connector (13 a, 13 b, 13 c), each adapted to be connected to a different load (14 a, 14 b, 14 c) of a plurality of loads.

12. The controller according to claim 9, comprising a plurality of said at least one connector (13 a, 13 b, 13 c), each adapted to be connected to a different load (14 a, 14 b, 14 c) of a plurality of loads.

13. The controller according to claim 10, wherein said detection device (16 a, 16 b, 16 c, 16 d) is connected to only one connector (13 a, 13 b, 13 c) of said plurality, preferably to a power supply connector (13 a, 13 b, 13 c) of a refrigeration machine compressor.

14. The controller according to claim 11, wherein said detection device (16 a, 16 b, 16 c, 16 d) is connected to only one connector (13 a, 13 b, 13 c) of said plurality, preferably to a power supply connector (13 a, 13 b, 13 c) of a refrigeration machine compressor.

15. The controller according to claim 12, wherein said detection device (16 a, 16 b, 16 c, 16 d) is connected to only one connector (13 a, 13 b, 13 c) of said plurality, preferably to a power supply connector (13 a, 13 b, 13 c) of a refrigeration machine compressor.

16. The controller according to claim 10, comprising a plurality of said at least one detection device (16 a, 16 b, 16 c, 16 d), each connected to a single connector (13 a, 13 b, 13 c) of said plurality of connectors or comprising only one of said detection devices (16 a, 16 b, 16 c, 16 d) connected to each connector (13 a, 13 b, 13 c) of said plurality of connectors in order to detect the current flow in at least one of said connectors.

17. The controller according to claim 11, comprising a plurality of said at least one detection device (16 a, 16 b, 16 c, 16 d), each connected to a single connector (13 a, 13 b, 13 c) of said plurality of connectors or comprising only one of said detection devices (16 a, 16 b, 16 c, 16 d) connected to each connector (13 a, 13 b, 13 c) of said plurality of connectors in order to detect the current flow in at least one of said connectors.

18. The controller according to claim 12, comprising a plurality of said at least one detection device (16 a, 16 b, 16 c, 16 d), each connected to a single connector (13 a, 13 b, 13 c) of said plurality of connectors or comprising only one of said detection devices (16 a, 16 b, 16 c, 16 d) connected to each connector (13 a, 13 b, 13 c) of said plurality of connectors in order to detect the current flow in at least one of said connectors.

* * * * *